PICK-UP DEVICES FOR COLOUR TELEVISION

Filed April 7, 1958 3 Sheets-Sheet 1

Inventors
G. R. Watson
D. G. Perkins
I. J. P. James
By Glascock Downing & Seebold
Attys.

Jan. 16, 1962 G. R. WATSON ET AL 3,017,455

PICK-UP DEVICES FOR COLOUR TELEVISION

Filed April 7, 1958 3 Sheets-Sheet 2

Inventors
G. R. Watson
D. G. Perkins
I. J. P. James
By Glascock Downing & Seebold
Attys.

PICK-UP DEVICES FOR COLOUR TELEVISION

Filed April 7, 1958 3 Sheets-Sheet 3

Inventors
G. R. Watson
D. G. Perkins
I. J. P. James
By Glascock Downing & Seebold
Attys.

United States Patent Office 3,017,455

Patented Jan. 16, 1962

3,017,455

PICK-UP DEVICES FOR COLOUR TELEVISION

George Ross Watson, Ickenham, Uxbridge, Denis Gordon Perkins, Gerrards Cross, and Ivanhoe John Penfound James, South Ealing, London, England, assignors to Electric & Musical Industries Limited, Hayes, England, a company of Great Britain Filed Apr. 7, 1958, Ser. No. 726,861
Claims priority, application Great Britain Apr. 11, 1957
6 Claims. (Cl. 178—5.4)

Figure 1:
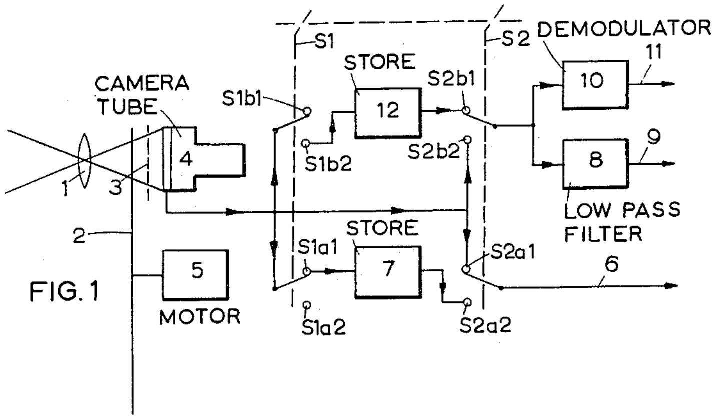

This invention relates to pick-up devices for colour television.

Colour television cameras for generating simultaneous colour television signals are often arranged to include pick-up devices comprising three pick-up tubes from which tubes three component signals, red, green and blue, say, representative of the image are derived simultaneously. However, disadvantages are encountered with such cameras due to the difficulty of registering the three components accurately and correcting for the sensitivity variations across the photo-sensitive surfaces of the tubes.

It has been proposed to reduce these disadvantages in pick-up devices by employing a single pick-up tube in conjunction with colour filters in the form of gratings disposed in front of the tube so that the three component signals may be derived from the signal tube and separated thereafter on a frequency basis. The strips of the gratings are disposed in a transverse direction to that of the scanning in the tube and may be so arranged, for example, that the signals derived from the tube comprise a video signal representative of the green component variation, say, and two different carrier waves having respective amplitude modulations representative of the red and blue component variations, say. In order to derive adequate information from these derived signals, however, the carrier frequencies have to be of the order of, or above, the limiting resolution of existing pick-up tubes, so that the degree to which coloured scenes may be represented by the signals derived from such arrangements is dependent on the camera tube resolution.

It has also been proposed to reduce the latter disadvantage in pick-up devices by employing two pick-up tubes, one to generate the green component signal or the high definition luminance signal, say, and the other to generate a red component video signal and a sub-carrier wave having an amplitude modulation representative of the blue component variations. Since this arrangement comprises two pick-up tubes, the same difficulties of registration and sensitivity variation errors arise as for a three-tube camera, although to a lesser degree.

The object of the present invention is to provide a pick-up device for colour television employing a single pick-up tube for generating simultaneous colour television signals wherein the above disadvantages are substantially avoided.

According to the present invention there is provided a pick-up device for generating colour television signals comprising a charge storage target, means for scanning said target according to a television raster to derive electrical signals corresponding to charges stored by said target, and optical means for projecting an image on said target, including first filter means in the light transmission path to said target having alternate strips which transmit first and second colour components of corresponding areas of said image and intervening strips which transmit said first colour component and a third colour component of corresponding areas of said image, second filter means which transmits said second and third colour components but not said first colour component and third filter means which transmits said first colour component but not said second and third components, means synchronized with said scanning means for introducing said second filter means into the light path of said target during alternate field periods and for introducing said third filter means into the light path to said target during intervening field periods, to cause charges corresponding to said second and third colour components of an image divided into a plurality of separate lines to be stored on said target during said intervening field periods, and to cause charges corresponding to said first colour component of an image to be stored on said target during said alternate field periods and means dependent upon said lines for separating signals corresponding to said second and third colour components.

Figure 2:
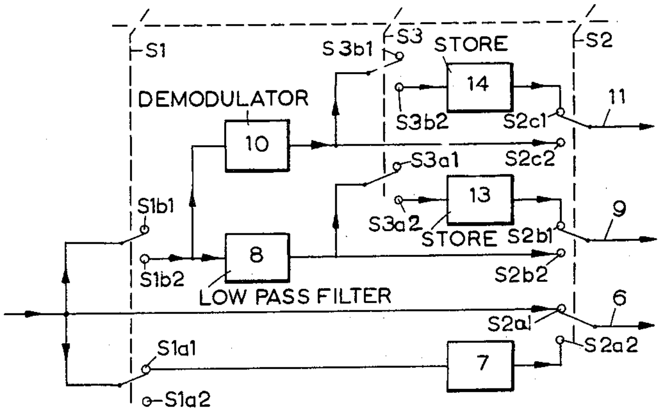
Figure 3:
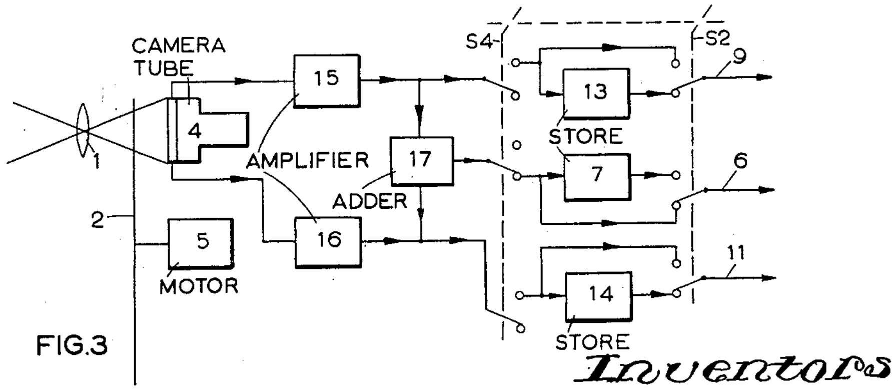
Figure 4:
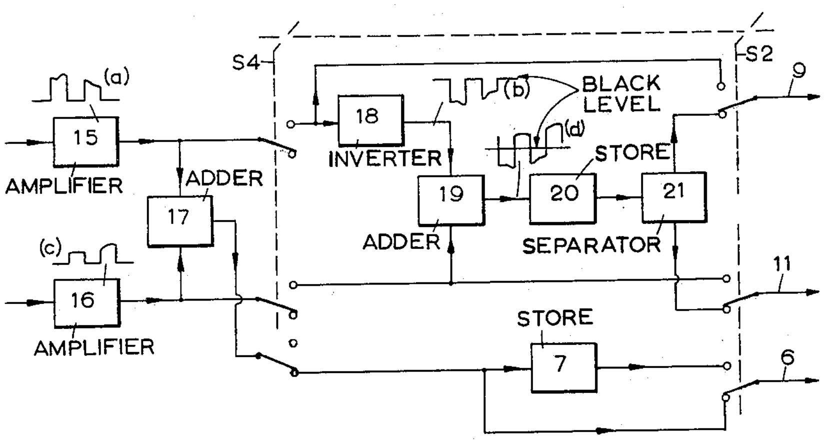
Figure 5:
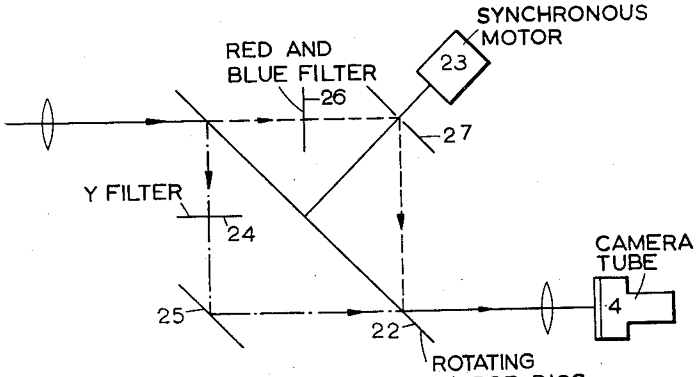

In order that the present invention may be clearly understood and readily carried into effect, the same will now be more fully described with reference to the accompanying drawings in which:

FIGURE 1 illustrates one example of a pick-up device according to the present invention, FIGURE 2 illustrates an alternative arrangement of FIGURE 1, FIGURE 3 illustrates a further arrangement of a pick-up device for colour television according to the present invention, FIGURE 4 illustrates an alternative arrangement of the device of FIGURE 3, FIGURE 5 illustrates optical apparatus for use with the arrangements of FIGURES 1 to 4, FIGURE 6 illustrates a filter arrangement for use with the devices shown in FIGURES 1 to 4, and FIGURE 7 illustrates a signal plate arrangement for use with the device shown in FIGURE 3.

Figure 6:
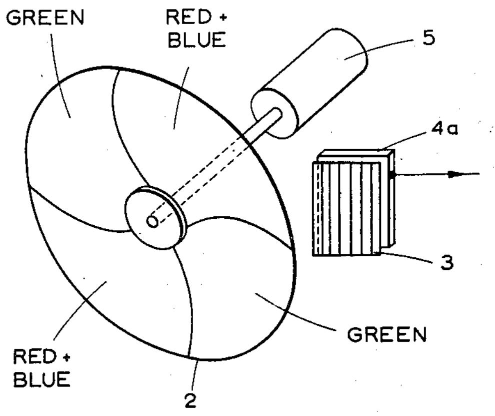

In FIGURE 1 light from the object scene is focussed by a lens 1 through a rotatable filter disc 2 consisting of coloured sections and thence through a grating 3 on the photo-sensitive surface of a camera pick-up tube 4. The grating 3 comprises alternate strips which are fully transmitting, separated by strips which transmit yellow (green and red) light only and is situated sufficiently close to the photo-sensitive surface of the tube 4 to cause a well defined pattern to be formed on the photo-sensitive surface transverse (preferably perpendicular) to the direction of line scanning in the tube 4, as hereinafter described. The filter disc 2 and the target 4*a* and strip filter 3 are shown in FIGURE 6. In FIGURE 6, the disc 2 is shown having four sections but, a greater or lesser number may be employed if desired similarly, only a small number of strips are shown in the filter 3 but a very much greater number are used in practice. Alternatively the grating 3 may be spaced from the tube 4 in a relay lens system to produce a well defined pattern. The rotatable filter disc 2 comprises alternate sections which transmit only green light and intermediate sections which transmit only red and blue light, the sections being arranged in spiral form in well-known manner. The disc 2 is rotated by a motor 5 which is synchronised by field synchronising pulses from the scanning circuit (not shown) associated with the tube 4 so that light incident on the part of tube 4 being scanned passes through the trailing edge of a green transmitting section of the disc 2 for alternate fields of the scanning in the tube 4 and through the trailing edge of the red and blue transmitting sections of the disc 2 for the intervening fields.

During the fields in which the trailing edge of the green filter of the disc 2 is disposed in front of the part of tube 4 being scanned, the green component of the incident light is transmitted unaffected by the grating 3 to the photo-sensitive surface of the tube 4, so that the output signals derived from the tube 4 during these fields are in video form and are representative of the green component. During the intervening fields the red and blue components of the incident light are transmitted by the magenta filter of the disc 2 and the red component is transmitted unaffected by the grating 3, so that the output signals derived from the tube 4 during these intervening fields comprise a video signal representative of the red component. The blue component, however, is only transmitted by the fully transmitting strips of the grating 3 and is applied to the photo-sensitive surface of the tube 4 in a pattern with line structure transverse to the line scanning direction in the tube 4, so that the output signals derived from the tube 4 during said intervening fields also comprise a carrier having amplitude modulation representative of the blue component.

The green component video signals are fed during their respective fields directly to an output line 6 via contact S2*a*1 of switch S2 and also to a store 7 via contact S1*a*1 of switch S1, as shown. The store 7 stores the applied signals for one field period at which time the switches S1 and S2 are changed to the alternate positions to those shown so that the stored signals are fed to the line 6 from the store 7 during the intervening fields via contact S2*a*2 of switch S2. Also during the intervening fields the output signals from the tube 4 are fed via contact S2*b*2, of switch 2, directly to a low pass filter 8, which passes only the red component video signal to the output line 9 and to a demodulator 10 which detects the blue component as a video signal and applies this video signal to the output line 11. The tube output is also applied during said intervening fields, via contact S1*b*2 of switch 1 to a store 12, which is similar to the store 7, and the stored signals are applied via contact S2*b*1 of the switch S2 to the low pass filter 8 and demodulator 10 during said alternate fields.

Thus, simultaneous colour television signals are generated by the use of a single camera tube and by storing each field for a field period so as to provide a substantially continuous output signal for each colour component. Such an arrangement is not severely limited in scope by the camera tube resolution and is unaffected apart from brightness variations by the sensitivity variations of the photo-sensitive surface of the tube 4. Also no registration errors arise by the use of the single tube 4 and it is desirable that the stores 7 and 12 do not introduce substantial registration errors or transmission variations. One suitable form of storage tube for use in the arrangement of FIGURE 1 is a cathode potential stabilised tube such as that described in United States Patent No. 2,507,958.

Such a tube may be used as a field storage means by flashing a light on to the photocathode during field blackout time to charge the target uniformly positively and then scanning the target during the following field with the cathode potential modulated by the signal to be stored so that a charged pattern of the signal information is thereby left on the target to be read off by scanning with an unmodulated cathode potential during the next field. Clearly, the target must be charged more positively than the peak of signal information to be stored. The scanning waveforms employed by such stores 7 and 12 may be the same as those employed by the tube 4 and since the same electron beam and scanning circuits are used for "writing on" and "reading off" the signal information the geometrical distortions in the storage tubes are cancelled out. Also effects of photocathode sensitivity variations of the storage tubes are not troublesome.

In an alternative arrangement the cathode potential may be constant and the target potential modulated by the signal to be stored.

In order to avoid detail in the red component video signal having a frequency variation of the order of the lower blue component subcarrier signal frequencies, diffusing material may be included in the magenta area of the disc 2 to remove the unrequired detail in the red component. Also any low frequency blue component signal introduced into the red component signal may be removed by a suitable matrix network after the demodulation of the blue component signal.

FIGURE 2 illustrates an alternative arrangement of FIGURE 1 in which the output signals derived from the tube 4 (not shown) are applied via contact S1*b*2 of switch S1 during said intervening fields directly to low pass filter 8 and demodulator 10 and the resultant red and blue component video signal outputs are applied to separate storage tubes 13 and 14, via contacts S3*a*2 and S3*b*2, respectively, and to their respective output lines 9 and 11 via contacts S2*b*2 and S2*c*2 of switch 2. During the generation of the green component video signal output from tube 4 the red and blue component video signals are derived simultaneously from the stores 13 and 14 via contacts S2*b*1 and S2*c*1 of switch S2, respectively.

Figure 7:
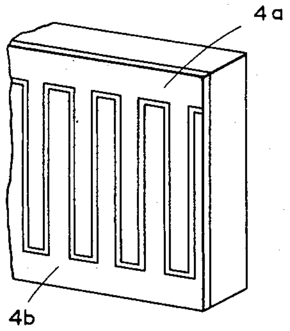

In a further example according to the invention illustrated by FIGURE 3, the single camera tube 4 is provided with two signal plates. These plates are comprised of parallel strips transverse (preferably perpendicular) to the line scanning direction in tube 4 and are connected to one of two output leads each of which is common to one plate and the strips are interleaved in a comb fashion so that successive strips belong to different ones of the plates. The form of the signal plates is illustrated in FIGURE 7 which illustrates a fragment thereof. The separate signal plates are represented by references 4*a* and 4*b*. It will be understood however that FIGURE 7 is not to scale for clearly in practice the interleaved strips are substantially larger and narrower. The strips of the respective plates are associated with the strips of a filter successive ones of which strips are sensitive to red and green light only and blue and green light only and the plates are connected to different head amplifiers 15 and 16, respectively. A light scene is transmitted to the tube 4 via a lens 1 and a rotatable disc 2 similar to that of FIGURE 1, but without the diffusing material in the magenta area, and rotated by a similar motor 5. Thus, during alternate fields a normal green component video signal is derived successively from the two signal plates and applied to the amplifiers 15 and 16. These amplifiers are connected to an adding circuit 17 which combines the outputs of the two amplifiers 15 and 16 and applies the combined signal to the store 7 via switch S4 and the output line 6 via switches S4 and S2, as shown. During the intervening fields only the red and blue components of the light scene are transmitted via the magenta area of the disc 2 to the part of the tube 4 being scanned, which tube 4 alternately generates red and blue component video signal outputs from the different signal plates, these signals being applied to the amplifiers 15 and 16, respectively. The switches S2 and S4 are in the alternate positions to those shown during these intervening fields so that the red and blue component video signals are fed to stores 13 and 14, respectively, via switch S4 and to their respective output lines 9 and 11 via switches S4 and S2. Also during these latter fields the output of store 7 is switched to the output line 6 as in FIGURES 1 and 2 and during the generation of the green component video signal from the tube 4 the outputs of stores 13 and 14 are switched to their respective output lines 9 and 11, as in FIGURE 2.

In an alternative arrangement the two signal plates of tube 4 may be associated with different photo-conductive or photo-emissive materials respectively responsive to red and green light only and blue and green light only.

In another arrangement of the example of FIGURE 3 illustrated by FIGURE 4 only one storage tube of the above-described type is required for the red and blue component signals, the green channel of the arrangement being unchanged. As shown in FIGURE 4, when the switches S2 and S4 are in the alternative positions the amplified red component output signal a fragment of which is depicted at (*a*) from the tube 4 is applied to an inverting circuit 18 the output (*b*) of which is added to the amplified blue component output (*c*) signal from the tube 4 in an adding circuit 19 so that the compound signal output (*d*) from this adding circuit 19 is comprised of successive positive and negative pulses modulated in correspondence with the red and blue component variations, respectively, and having a reference potential equal to that of the separate output signals of the tube 4, namely the black level generated during each line blackout period. This compound signal (*d*) is applied to a storage tube 20 in the manner described above during the intervening fields whilst the separate red and blue component signals are applied to their respective output lines 9 and 11 as before. After a delay of one field period the compound signal is derived from the storage tube 20 and applied to a signal separator 20 which may comprise two limiters to select the positive or blue component, or the negative or red component of the compound signal which components are applied to their respective output lines 11 and 9. The red component output from the separator 21 may be inverted once again before being applied to the output line 9 and the inverting circuit 18 may be employed for this purpose if suitable switching arrangements other than those illustrated are provided.

In the above-described arrangements the stores may comprise magnetic tape or drum storage means or since a delay of one field period is required sonic delay lines may be employed.

The invention may also be applied to colour film scanning arrangements wherein each of the colour film frames are displayed before the pick-up tube for two field periods, for example, so that colour fringing effects are substantially reduced. In the conventional use of a colour television camera according to the invention there are some colour fringing effects caused by fast moving objects in the scene being televised, but these effects are not objectionable for many industrial applications of the invention and may be less objectionable for studio use than the misregistration and shading errors which are found to occur with the use of colour television cameras comprising two or three pick-up tubes.

Although the invention has been described with reference to arrangements for generating colour television signals comprising red, green and blue component signals, it is not intended to be limited thereby and different colour components may be employed. For example, the green filter in the arrangements of FIGURES 1 and 2 may be replaced by a filter arranged to transmit the green and red components of the high definition luminance or so-called Y signal, that is 0.59G+0.30R, and a low definition blue component, that is 0.11B, may be added to this green and red "signal" from the blue component output line 11. Alternatively, a Y signal may be generated instead of a green component signal in any of the arrangements of FIGURES 1 to 4 by employing different optical paths to the camera tube for the Y component image, and the red and blue component images. This may be accomplished as illustrated in FIGURE 5 by the use of a rotating mirror disc 22 having mirror surface areas or dichroic mirrors arranged to focus the desired component images on the mosaic of the camera tube 4 during alternate fields as described above in each case. In FIGURE 5 the disc 22 is rotated by a synchronous motor 23 so that light is reflected through a Y filter 24 and to the tube 4 by a fixed mirror 25 during alternate fields and through a filter 26 comprised of successive strips which are red and magenta transmitting (FIGURES 1 and 2), respectively, or red and blue transmitting (FIGURES 3 and 4) respectively, as the case may be, and to the tube 4 by a fixed mirror 27 during intervening fields.

What we claim is:

1. A pick-up device for generating colour television signals comprising a charge storage target, means for scanning said target according to a television raster to derive electrical signals corresponding to charges stored by said target, and optical means for projecting an image on said target, including first filter means in the light transmission path to said target having alternate strips which transmit first and second colour components of corresponding areas of said image and intervening strips which transmit said first colour component and a third colour component of corresponding areas of said image, second filter means which transmits said second and third colour components but not said first colour component and third filter means which transmits said first colour component but not said second and third components, means synchronised with said scanning means for introducing said second filter means into the light path of said target during alternate field periods and for introducing said third filter means into the light path to said target during intervening field periods, to cause charges corresponding to said second and third colour components of an image divided into a plurality of separate lines to be stored on said target during said intervening field periods, and to cause charges corresponding to said first colour component of an image to be stored on said target during said alternate field periods and means dependent upon said lines for separating signals corresponding to said second and third colour components.

2. A pick-up device for generating colour television signals comprising a charge storage target, means for scanning said target according to a television raster to derive electrical signals corresponding to charges stored by said target, and optical means for projecting an image on said target including first filter means in the light transmission path to said target having alternate strips which transmit first and second colour components of corresponding areas of said image and intervening strips which transmit said first and second colour components and a third colour component of corresponding areas of said image, second filter means which transmits said second and third colour components but not said first colour component and third filter means which transmits said first colour component but not said second and third colour components, means synchronised with said scanning means for introducing said second filter means into the light path to said target during alternate field periods and for introducing said third filter means into the light path to said target during intervening field periods, to cause charges corresponding to said second and third colour components of an image divided into a plurality of respectively separate lines to be stored on said target during said intervening field periods, and to cause charges corresponding to said first colour component of an image to be stored on said target during said alternate field periods, three output terminals and separating means comprising a low pass filter for signals corresponding to said second colour component and a demodulator for signals corresponding to said third colour component respective first and second stores for signals derived during alternate and intervening field periods, means synchronised with said scanning means for applying signals derived as a result of aid scanning during said alternate field periods to said first store and one of said output terminals, for applying signals derived as a result of said scanning during said intervening field periods to said second store and via said separating means to the other two output terminals and for applying signals held in said first and second stores to the respective output terminals during the intervening and alternate field periods respectively.

3. A pick-up device for generating colour television signals comprising a charge storage target, means for scanning said target according to a television raster to derive electrical signals corresponding to charges stored by said target, and optical means for projecting an image on said target including first filter means in the light transmission path to said target having alternate strips which transmit first and second colour components of corresponding areas of said image and intervening strips which transmit said first and second colour components and a third colour component of corresponding areas of said image, second filter means which transmits said second and third colour components but not said first colour component and third filter means which transmits said first colour component but not said second and third colour components, means synchronised with said scanning means for introducing said second filter means into the light path of said target during alternate field periods and for introducing said third filter means into the light path to said target during intervening field periods, to cause charges corresponding to said second and third colour components of an image divided into a plurality of respectively separate lines to be stored on said target during said intervening field periods, and to cause charges corresponding to said first colour component of an image to be stored on said target during said alternate field periods, three output terminals, and separating means comprising a low pass filter for signals corresponding to said second colour component and a demodulator for said signals corresponding to said third colour component, respective first, second and third stores for signals representing said first, second and third colour components, three output terminals, means synchronised with said scanning means for applying signals derived as a result of said scanning during said alternate field periods to said first store and a first of said output terminals, applying signals derived as a result of said scanning during said intervening field periods via said separating means to said second and third stores and respectively to the other two output terminals and for applying signals held in said first store to the first output terminal during intervening field periods and applying signals held in said second and third stores to the respective other output terminals during alternate field periods.

4. A pick-up device according to claim 1, said target comprising two comb-like signal plates said signal plates being interleaved so as to register respectively with said alternate and intervening strips of said first filter means.

5. A pick-up device according to claim 4, comprising three output terminals and respective first, second and third stores for signals representing said first, second and third colour components and means synchronised with said scanning means for adding signals derived from said signal plates during alternate field periods and applying said added signals to said first store and a first of said output terminals, for applying signals derived from said signal plates during intervening field periods respectively to said second and third stores and second and third ones of said output terminals, for applying signals held in said first store to said first output terminal during said intervening field periods and for applying signals held in said second and third stores to said second and third output terminals respectively during said alternate field periods.

6. A pick-up device according to claim 4, a first store for signals representing said first colour component and a second store for signals representing said second and third colour component, first adding means for adding signals derived from said signal plates with the same phase and applying the added signals to said first store, and second adding means for adding signals derived from said signal plates with opposite phase and applying the added signal to said second store, separating means for separating signals stored in said second store corresponding to said second and third colour components and means synchronised with said scanning means for applying signals derived from said signal plates during said alternate field periods to said first adding means and to a first of said output terminals, for applying signals derived from said signal plates during said intervening field periods to said second adding means and respectively to the other two of said output terminals, for applying signals held in said first store during said intervening field periods to said first output terminal and for applying the separated signals derived from said separating means during alternate field periods to respective appropriate ones of said other two output terminals.

No references cited.